(12) United States Patent
Carvalho

(10) Patent No.: US 7,581,929 B2
(45) Date of Patent: Sep. 1, 2009

(54) ROTATIONAL AIRFOIL BALANCE SYSTEM

(75) Inventor: Paul Armand Carvalho, Westfield, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 491 days.

(21) Appl. No.: 11/249,602

(22) Filed: Oct. 13, 2005

(65) Prior Publication Data

US 2008/0003107 A1    Jan. 3, 2008

(51) Int. Cl.
B64C 11/20    (2006.01)
(52) U.S. Cl. ............................. 416/145; 416/233
(58) Field of Classification Search ............... 416/144, 416/145, 146 A, 500
See application file for complete search history.

(56) References Cited

U.S. PATENT DOCUMENTS

| | | | | |
|---|---|---|---|---|
| 1,903,817 A | * | 4/1933 | Johnson | 416/145 |
| 2,300,233 A | * | 10/1942 | Erle | 416/157 R |
| 2,339,624 A | * | 1/1944 | Davis | 416/145 |
| 2,451,541 A | * | 10/1948 | Doman | 416/145 |
| 2,494,756 A | * | 1/1950 | Gruetjen | 416/145 |
| 2,715,446 A | * | 8/1955 | Felt | 416/145 |
| 2,955,662 A | * | 10/1960 | Bonnett et al. | 416/144 |
| 4,302,155 A | * | 11/1981 | Grimes et al. | 416/144 |
| 5,304,038 A | | 4/1994 | MacMurray | |
| 5,791,595 A | * | 8/1998 | Jamieson | 244/65 |
| 5,823,466 A | | 10/1998 | Jamieson | |
| 5,971,322 A | | 10/1999 | Beretta et al. | |
| 6,213,719 B1 | | 4/2001 | Violette et al. | |
| 6,305,905 B1 | | 10/2001 | Nagle et al. | |

* cited by examiner

Primary Examiner—Edward Look
Assistant Examiner—Nathaniel Wiehe
(74) Attorney, Agent, or Firm—Carlson, Gaskey & Olds PC

(57) ABSTRACT

A balance system for a rotational airfoil assembly includes a bulkhead, an elongated member, a support member and at least one balance weight. The elongated member extends through the bulkhead along a bore toward an airfoil tip segment of the airfoil assembly. The balance weights are mounted to a tip segment of the elongated member positioned within the bore outboard of an airfoil mid-span segment of the airfoil assembly. A reduced quantity of weight is required to balance the airfoil assembly because of the location of the balance weights outside of the mid-span segment of the airfoil assembly.

8 Claims, 4 Drawing Sheets imization of ROTATIONAL AIRFOIL BALANCE SYSTEM

BACKGROUND OF THE INVENTION

The present invention relates to a rotational airfoil assembly, and more particularly to a balance system therefor.

Aircraft such as turboprops, tilt rotors and helicopters include rotational airfoil assemblies such as propeller blade and rotor blade systems. Propeller blades are secured to a hub of an aircraft via a retention assembly. The blades are dynamically balanced about the axis of rotation of the hub to minimize vibration and noise that may occur during operation. Specifically, the blades must be balanced about the axis of rotation of the hub to balance both the action of a centrifugal force produced by the rotation of the blades and the moments caused by aerodynamic forces generated by the relative speed of the blades with respect to the air.

One conventional method of blade balancing includes machining a cavity into a blade on an inboard side of the blade and inserting lead wool into the machined cavity until the proper balance is achieved. Disadvantageously, blade balance systems of this type are relatively expensive to manufacture due the relatively large amount of machining required to provide the cavity within the blade bore.

Other conventional blade balance systems include a removable balance cartridge insertable into a bore of a blade. A receiver is bonded to the bore of the blade on an inboard side the blade and a balance cartridge is mounted within the receiver. The balance requirements of each particular blade are determined by balancing the blade against a pre-balanced master blade on a balance stand. Once the balance requirement is determined for a particular blade, an appropriate number of relatively high density weights are mounted within the balance cartridge to provide the necessary balance.

Although effective, conventional blade balance systems require a relatively significant quantity of weight to be added relative to the overall weight of a blade.

Accordingly, it is desirable to provide a balance system for a rotational airfoil that effectively balances a rotational airfoil with a minimal addition to the overall blade weight.

SUMMARY OF THE INVENTION

A balance system according to the present invention generally includes a bulkhead, an elongated member, a support and at least one balance weight. The airfoil assembly includes a bore which defines a longitudinal axis. The elongated member extends through the bulkhead along the longitudinal axis toward a tip segment of the airfoil assembly. A tip segment of the elongated member extends along the longitudinal axis proximate to a mid-span segment of the airfoil assembly. At least one balance weight is mounted to the tip segment to balance the airfoil assembly. Locating the balance weights on the elongated member outside of the mid-span segment along the longitudinal axis balances the airfoil with a reduced quantity of weight as compared to prior art balance systems.

The balance system for a rotational airfoil of the present invention effectively balances a rotational airfoil with a minimal addition to the overall blade weight.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
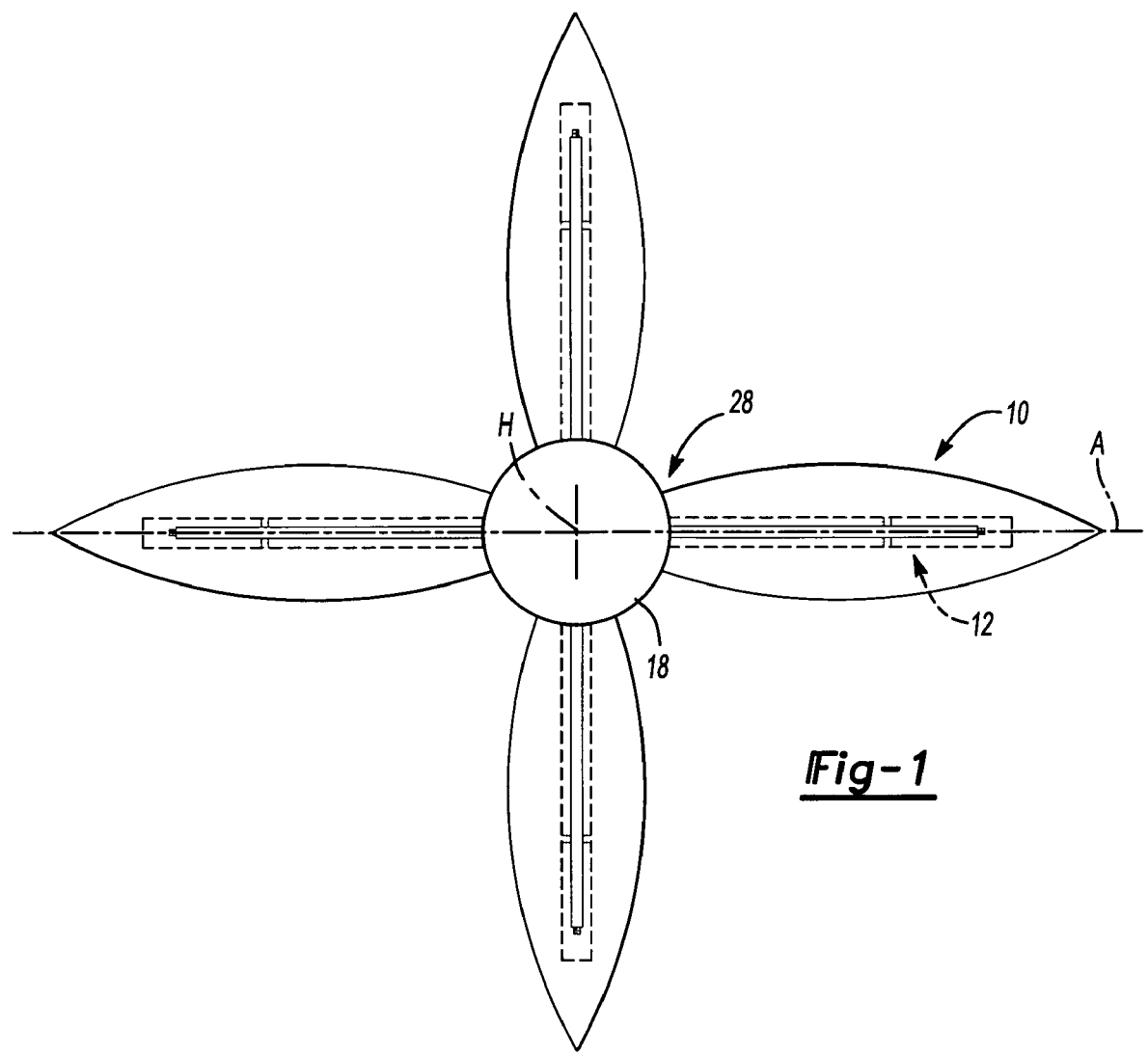
FIG. 1 is a schematic view of a rotational airfoil assembly.

Referring to FIG. 1, a multitude of rotational airfoil assemblies 10 are mounted to a hub assembly 18 at an airfoil root segment 28 for rotation about a hub axis H. Each rotational airfoil assembly 10 includes a balance system 12 according to the present invention. The rotational airfoil assembly 10 is shown and described herein in terms of a propeller blade, however, it should be understood that various other airfoil assemblies such as rotor blade systems may employ the configuration disclosed herein.

Figure 2:
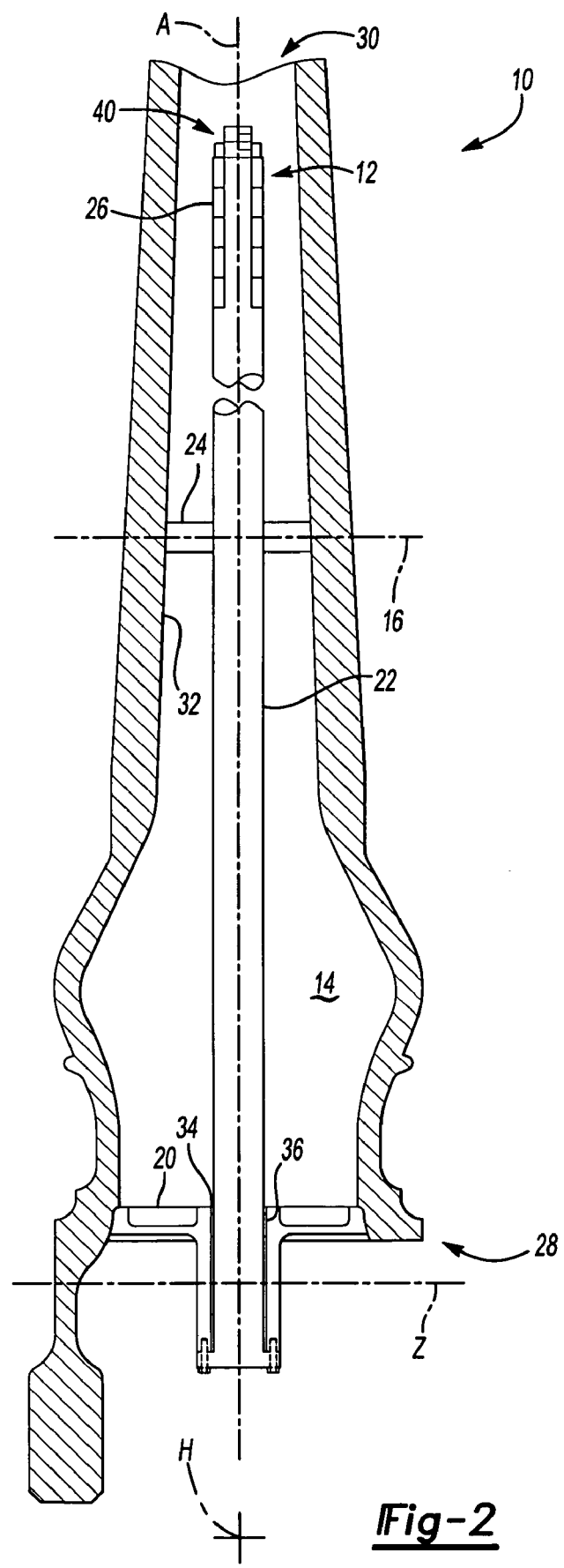
FIG. 2 illustrates a cross-sectional view of a propeller blade including a balance system according to the present invention.

Referring to FIG. 2, the rotational airfoil assembly 10 includes a bore 14 which defines a longitudinal axis A. The rotational airfoil assembly 10 generally defines a longitudinal span between the airfoil root segment 28 and an airfoil tip segment 30. An airfoil mid-span segment 16 is defined generally between the airfoil root segment 28 and the airfoil tip segment 30 of the rotational airfoil assembly 10.

The balance system 12 permits dynamic balance of the rotational airfoil assembly 10 about the hub axis H. The balance system 12 generally includes a bulkhead 20, an elongated member 22, a support 24 and at least one balance weight 26. The bulkhead 20, the elongated member 22 and the support 24 are preferably manufactured from a composite material. It should be understood that other materials and combinations thereof may be utilized to construct the components of the balance system 12 of the present invention.

The bulkhead 20 is positioned transverse to the longitudinal axis A adjacent the airfoil root segment 28. The bulkhead 20 is preferably attached to an interior surface 32 of the bore 14 of the rotational airfoil assembly 10. The bulkhead 20 is preferably attached to the rotational airfoil assembly 10 through bonding, fastening or the like.

The elongated member 22 is preferably a rod. It should be understood that The elongated member 22 may be of various cross-sectional shapes and configurations and that the design of the elongated member 22 depends on application specific parameters such as the size and profile of the bore 14 of the rotational airfoil assembly. The elongated member 22 is positioned within the bore 14 and extends through a central aperture 34 of the bulkhead 20 along the longitudinal axis A. The elongated member 22 extends axially along the longitudinal axis A toward the airfoil tip segment 30 of the assembly 10. A tip segment 40 of the elongated member 22 extends into the bore 14 along the longitudinal axis A and is preferably positioned proximate of the mid-span segment 16 of the assembly 10. It should be understood that the actual length of the elongated member 22 and the position of the tip segment 40 will vary depending upon actual balance requirements for a particular rotational airfoil assembly 10.

At least one balance weight 26 is mounted to the elongated member 22 to balance the rotational airfoil assembly 10. The actual quantity of balance weights 26 mounted to the elongated member 22 depends upon the balance requirements for a particular rotational airfoil assembly 10. Preferably, the balance weights 26 are high density washers. However, other members may be utilized as the balance weights 26. The balance weights 26 are mounted to the tip segment 40 of the elongated member 22 outboard of the support 24.

The support 24 is positioned within the bore 14 of the assembly 10 between the airfoil root segment 28 and the airfoil tip segment 30. The support 24 is bonded to the interior surface 32 of the bore 14 outboard of the bulkhead 20 along the longitudinal axis A toward the airfoil tip segment 30 of the rotational airfoil assembly 10. Preferably, the support 24 is positioned within the airfoil mid-span segment 16 of the assembly 10 to support the elongated member 22. The support 24 is longitudinally located to minimize harmonic vibrations that may otherwise occur during operation.

Figure 3:
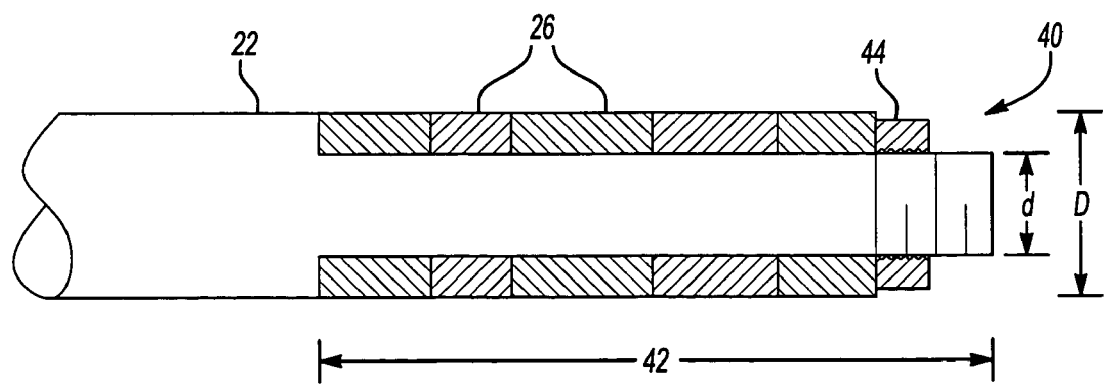
FIG. 3 is an exploded cross-sectional view of a tip segment of an elongated member according to the present invention.

Referring to FIG. 3, the tip segment 40 of the elongated member 22 includes a threaded segment 42 which defines a second diameter d which is preferably less than a diameter D of the elongated member 22. The balance weights 26 are received on the threaded segment 42 of the elongated member 22 to preferably define a diameter which, when combined with the threaded segment 42, is approximately equal to the diameter D of the elongated member 22. A threaded retainer 44, such as a nut, retains the balance weights 26 on the threaded segment 42 of the elongated member 22. It should be understood that other configurations and combinations thereof may be used to retain the balance weights 26 on the tip segment 40 of the elongated member 22. That is, the balance weights 26 may be threaded onto the threaded segment 42 as well as slid over the threaded segment 42. The balance weights 26 may also be of varying sizes and weights such that an exact amount of weight may be readily added to achieve the appropriate balance for a rotational airfoil assembly 10.

As the balance weights 26 are preferably positioned outboard of the mid-span segment 16 of the rotational airfoil assembly 10, a lesser overall quantity of balance weight is required than what has heretofore been utilized. That is, because the balance weights 26 are received on the tip segment 40 of the elongated member 22 and the tip segment 40 is positioned at least proximate of the airfoil mid-span segment 16 along the longitudinal axis A, the rotational airfoil assembly 10 may be balanced with a reduced quantity of weight which minimizes the overall weight of the rotational airfoil assembly 10.

Figure 4:
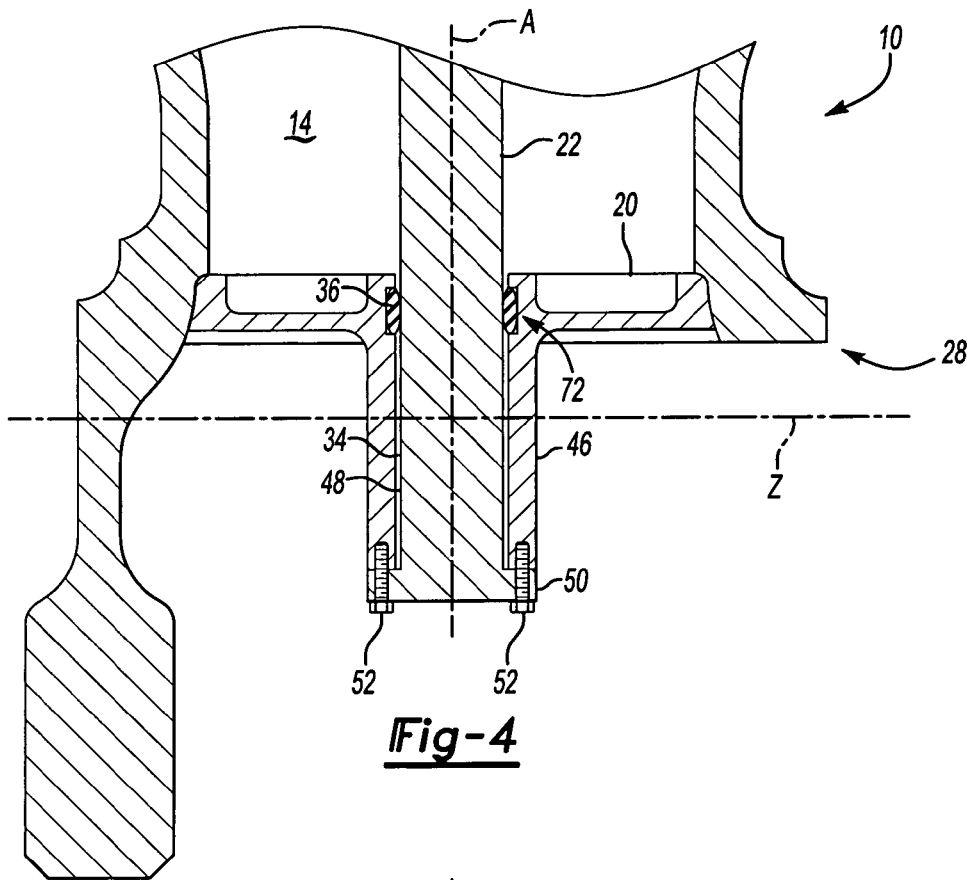
FIG. 4 is an exploded cross-sectional view of a root end of a propeller blade.

Referring to FIG. 4, the bulkhead 20 preferably includes an extension 46. A root segment 48 of the elongated member 22 includes a flange 50 and is mounted to the extension 46 of the bulkhead 20 to retain the elongated member 22 thereon.

As the elongated member 22 is extended through the central aperture 34 of the bulkhead 20, the flange 50 contacts the extension 46 such that the elongated member 22 is retained thereto. Fasteners 52, such as bolts, are utilized to mount the root segment 48 of the elongated member 22 to the extension 46. That is, during normal operation the elongated member 22 is retained to the extension 46 from centrifugal forces acting as the assembly 10 rotates about hub axis H (FIG. 1).

A seal 36 is mounted within the central aperture 34 between the bulkhead 20 and the elongated member 22. The seal 36 prevents the passage of a fluid such as a lubricant within the hub assembly 18 (FIG. 1) from entering the bore 14. The seal 36 is preferably an O-ring. Various other seal arrangements may be additionally or alternatively provided.

The extension 46 of the bulkhead 20 preferably extends along the longitudinal axis A which locates the central aperture 34 below the normal operating fluid level Z of the hub assembly 18. That is, because of centrifugal forces, the normal operating fluid level Z is typically at least partially above a portion of the extension 46. The extension 46 thereby minimizes the potential of lubricant being communicated through the central aperture 34 and into the bore 14. Further, attachment of the elongated member 22 to the extension 46 below the normal operating fluid level Z positions the seal 36 in a generally dry cavity 72. The potential for lubricant entering the bore 14 from the hub assembly 18 is therefore further alleviated.

Figure 5:
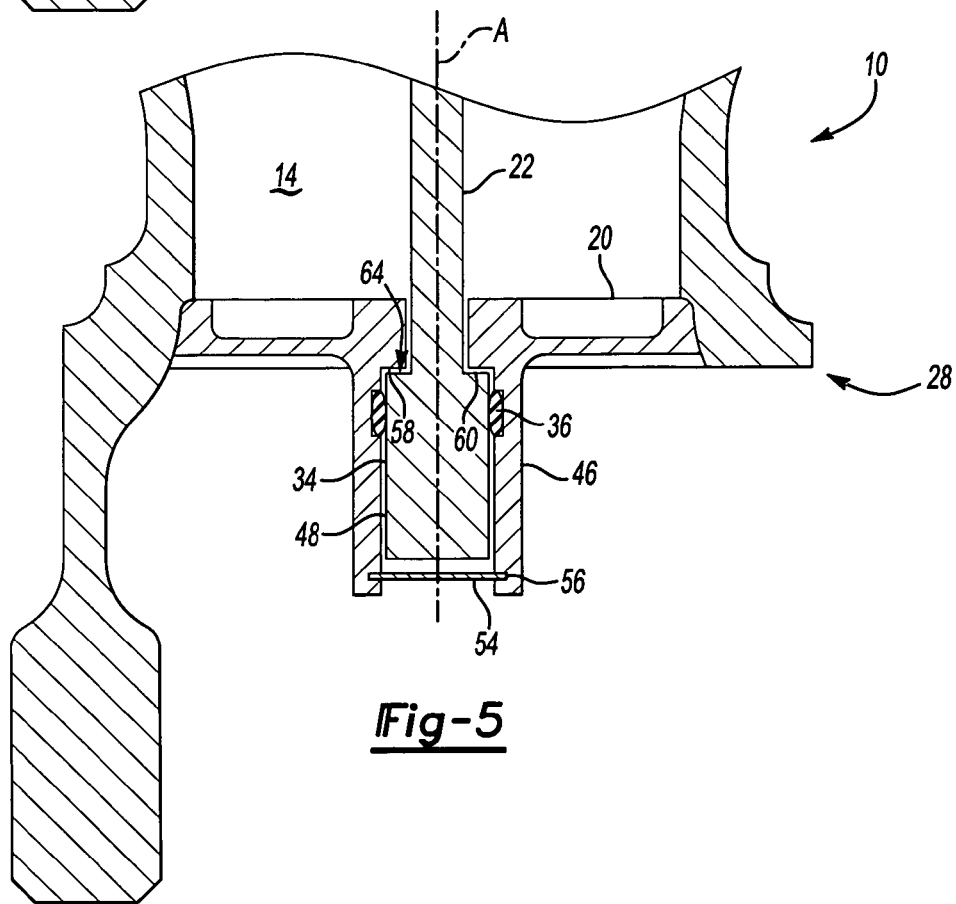
FIG. 5 illustrates another view of the root end of the propeller blade.

Referring to FIG. 5, a root segment 48 of the elongated member 22 may be secured to the extension 46 of the bulkhead 20 in an alternative arrangement. For example, the extension 46 comprises a groove 56 within the central aperture 34 which receives a snap ring 54. The snap ring 54 is preferably C-shaped, although other known snap ring designs may be utilized according to the present invention. The snap ring 54 is partially compressed prior to insertion into the groove 56 of the central aperture. Once slid into the groove 56, the snap ring 54 decompresses circumferentially into the groove 56 to prevent displacement of the elongated member 22 toward the hub assembly 18 (FIG. 1) along the longitudinal axis A.

Further, the bulkhead 20 defines a flange 58. The flange 58 contacts a shoulder portion 60 of the elongated member 22 to define a stop 64 therebetween. The stop 64 defined between the flange 58 and the shoulder portion 60 prevents displacement of the elongated member 22 toward the airfoil tip segment 30 (FIG. 1) during rotation of the assembly 10. That is, the stop 64 and the snap ring 54 retain the elongated member 22 to the bulkhead 20 during centrifugal forces. Although bolts or a snap ring are disclosed as preferable attachment devices, it should be understood that any other suitable device known in the art may be utilized to achieve the desired attachment of the elongated member 22.

Figure 6:
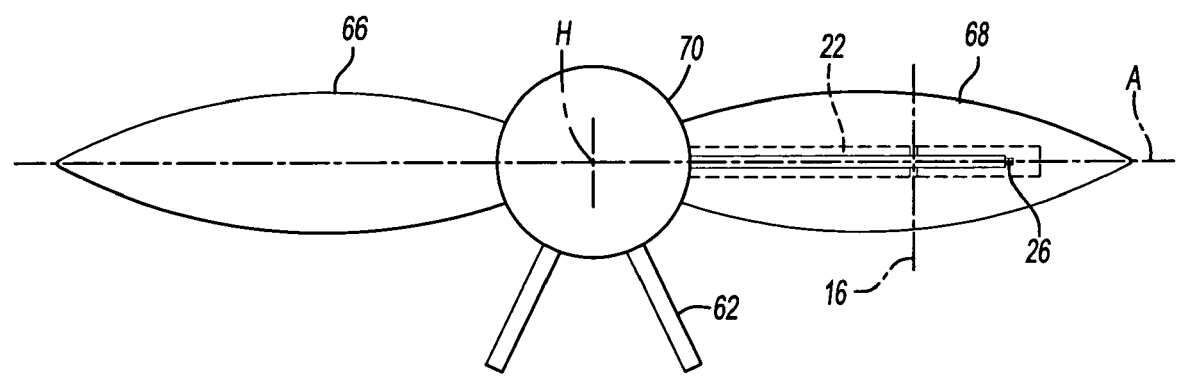
FIG. 6 schematically illustrates a method of balancing a propeller blade according to the present invention.

Referring to FIG. 6, the balance requirements for a particular rotational airfoil assembly 10 are determined with, for example only, a balance stand 62 (illustrated schematically). The balance stand 62 includes a dummy hub 70 for receiving a pre-balanced master blade 66 and an unbalanced blade 68. Balance specifications of the master blade 66 are known prior to utilizing the master blade 66 to balance the unbalanced blade 68, i.e. the master blade 66 has already been balanced to within a predetermined specification. The master blade 66 is attached to the balance stand 62 on one side of the hub axis H. The unbalanced blade 68 attaches to the dummy hub 70 opposite of the master blade 66. Balance weights 26 are preferably added to the elongated member 22 outboard of an airfoil mid-span segment 16 of the unbalanced blade 68 until the unbalanced blade 68 is balanced against the master blade 66.

The foregoing shall be interpreted as illustrative and not in a limiting sense. A worker of ordinary skill in the art would recognize that certain modifications would come within the scope of the invention. For that reason, the following claims should be studied to determine the true scope and content of this invention.

What is claimed is:

1. A rotational airfoil assembly, comprising:
   an airfoil which defines a bore along a longitudinal axis, said airfoil includes an airfoil root segment and an airfoil tip segment;
   a support located within said airfoil, said support located between said airfoil root segment and said airfoil tip segment;
   a bulkhead located within said airfoil root segment;
   an elongated member that defines a first diameter, said elongated member mounted within said bore, said elongated member includes a flange opposite a tip segment which defines a second diameter less than said first diameter and said flange defines a third diameter greater than said first diameter, said flange engaged with said bulkhead such that said extended member extends through said bulkhead and through said support; and at least one balance weight mountable to said tip segment outboard of said support.

2. The assembly as recited in claim 1, wherein said flange is retained to said bulkhead by a plurality of threaded fasteners.

3. The assembly as recited in claim 1, wherein said bulkhead comprises an extension segment, said extension segment extending along said longitudinal axis in a direction opposite of said elongated member.

4. The assembly as recited in claim 3, wherein at least a portion of said extension segment extends beyond a normal operating oil level of said rotational airfoil assembly along said longitudinal axis.

5. The assembly as recited in claim 3, wherein said flange is retained within a central aperture of said extension segment by a snap ring.

6. The assembly as recited in claim 1, wherein said tip segment is outboard a mid-span segment of said airfoil, said mid-span segment located between said airfoil root segment and said airfoil tip segment.

7. The assembly as recited in claim 6, wherein said at least one balance weight is mounted within said airfoil tip segment.

8. The assembly as recited in claim 1, wherein said support is located at a mid-span segment.

* * * * *

UNITED STATES PATENT AND TRADEMARK OFFICE
CERTIFICATE OF CORRECTION

PATENT NO. : 7,581,929 B2  Page 1 of 1
APPLICATION NO. : 11/249602
DATED : September 1, 2009
INVENTOR(S) : Paul Armand Carvalho It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 799 days.

Signed and Sealed this

Fourteenth Day of September, 2010

David J. Kappos
*Director of the United States Patent and Trademark Office*